(12) United States Patent
Moore

(10) Patent No.: US 11,859,388 B1
(45) Date of Patent: Jan. 2, 2024

(54) GUTTER-CLEANING DEVICE

(71) Applicant: Tommie Lee Moore, Chicago, IL (US)

(72) Inventor: Tommie Lee Moore, Chicago, IL (US)

( * ) Notice: Subject to any disclaimer, the term of this patent is extended or adjusted under 35 U.S.C. 154(b) by 527 days.

(21) Appl. No.: 17/146,571

(22) Filed: Jan. 12, 2021

Related U.S. Application Data

(63) Continuation-in-part of application No. 15/770,390, filed on Apr. 23, 2018, now abandoned.

(51) Int. Cl.
| | |
|---|---|
| *E04D 13/076* | (2006.01) |
| *B08B 3/02* | (2006.01) |
| *B08B 9/00* | (2006.01) |
| *B05B 13/06* | (2006.01) |
| *B05B 9/03* | (2006.01) |
| *F16L 9/22* | (2006.01) |
| *F16L 33/24* | (2006.01) |
| *B05B 15/63* | (2018.01) |

(52) U.S. Cl.
CPC ............ *E04D 13/0765* (2013.01); *B05B 9/03* (2013.01); *B05B 13/0627* (2013.01); *B05B 15/63* (2018.02); *B08B 3/026* (2013.01); *B08B 9/00* (2013.01); *F16L 9/22* (2013.01); *F16L 33/24* (2013.01); *B08B 2203/0247* (2013.01)

(58) Field of Classification Search
CPC .................................................. E04D 13/0765
See application file for complete search history.

(56) References Cited

U.S. PATENT DOCUMENTS

| | | | |
|---|---|---|---|
| 8,739,362 B1 * | 6/2014 | Conder | ..................... B08B 5/02 15/406 |
| 2011/0100403 A1 * | 5/2011 | Cox | ..................... E04D 13/0765 134/167 C |

* cited by examiner

*Primary Examiner* — Jason Y Ko

(74) *Attorney, Agent, or Firm* — Kyle A. Fletcher, Esq.

(57) ABSTRACT

The gutter-cleaning device is configured for use in removing debris from a gutter. The gutter-cleaning device discharges a flow of water into the gutter that washes away the debris. The gutter-cleaning device is an extension apparatus that extends the reach of a client such that the client can discharge the flow of water into the gutter while standing on the ground. The gutter-cleaning device comprises a plurality of pipes, a plurality of fittings, a hose, and a nozzle. The plurality of fittings interconnect the plurality of pipes to form a fluid network. The fluid network is a fluid series circuit that transports water received under pressure from the hose to the nozzle. The nozzle discharges the water into the gutter that washes away the debris.

16 Claims, 7 Drawing Sheets

GUTTER-CLEANING DEVICE

CROSS REFERENCES TO RELATED APPLICATIONS

This non-provisional application is a continuation-in-part application filed under 37 CFR 1.53(b) that claims a benefit under United States 35 USC 120 from non-provisional application U.S. Ser. No. 15/770,930. The inventor is Tommie Moore of Chicago, IL. This non-provisional application incorporates non-provisional application U.S. Ser. No. 15/770,930 in its entirety. The application U.S. Ser. No. 15/770,930 was received by the USPTO on Jan. 13, 2020 under 35USC371 as PCT/US2016/061896 on Jan. 13, 2020. The 371(c) date of U.S. Ser. No. 15/770,930 is Apr. 23, 2018.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building including gutters, more specifically, a device for removing debris from a gutter. (E04D13/076)

SUMMARY OF INVENTION

The gutter-cleaning device is configured for use in removing debris from a gutter. The gutter-cleaning device discharges a flow of water into the gutter that washes away the debris. The gutter-cleaning device is an extension apparatus that extends the reach of a client such that the client can discharge the flow of water into the gutter while standing on the ground. The gutter-cleaning device comprises a plurality of pipes, a plurality of fittings, a hose, and a nozzle. The plurality of fittings interconnect the plurality of pipes to form a fluid network. The fluid network is a fluid series circuit that transports water received under pressure from the hose to the nozzle. The nozzle discharges the water into the gutter that washes away the debris.

These together with additional objects, features and advantages of the gutter-cleaning device will be readily apparent to those of ordinary skill in the art upon reading the following detailed description of the presently preferred, but nonetheless illustrative, embodiments when taken in conjunction with the accompanying drawings.

In this respect, before explaining the current embodiments of the gutter-cleaning device in detail, it is to be understood that the gutter-cleaning device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gutter-cleaning device.

It is therefore important that the claims be regarded as including such equivalent construction insofar as they do not depart from the spirit and scope of the gutter-cleaning device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
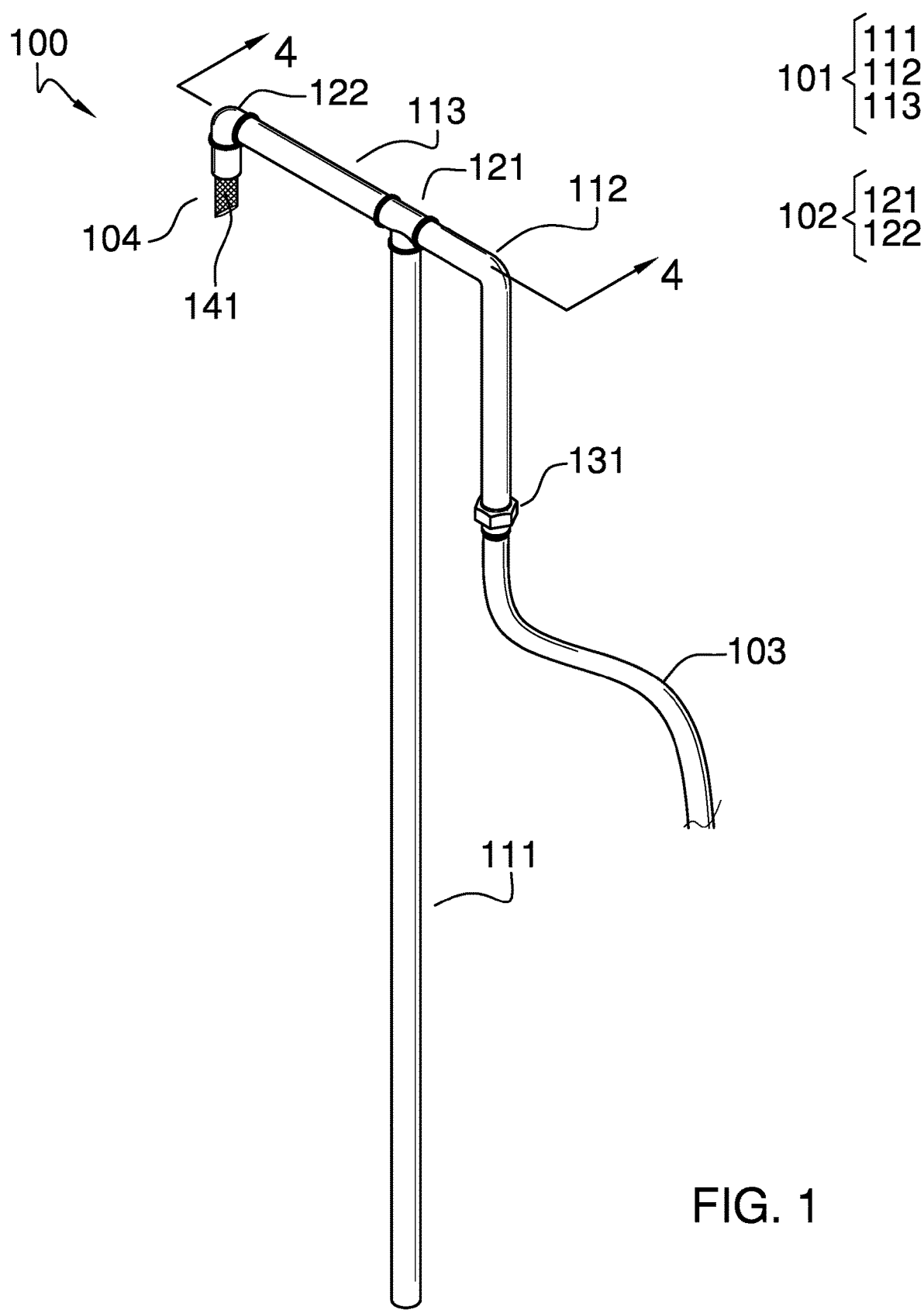
FIG. 1 is a perspective view of an embodiment of the disclosure.
Figure 2:
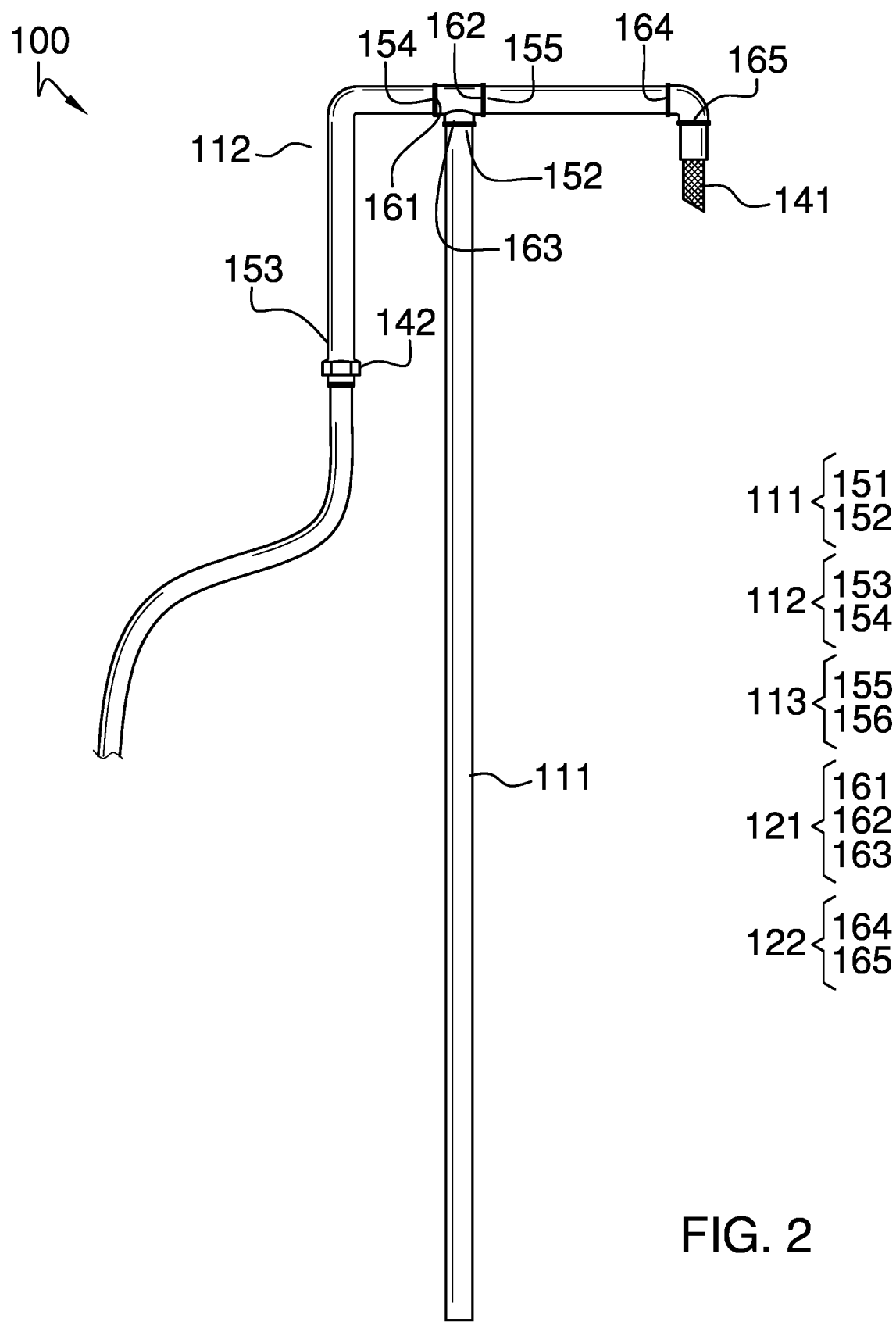
FIG. 2 is a side view of an embodiment of the disclosure.
Figure 3:
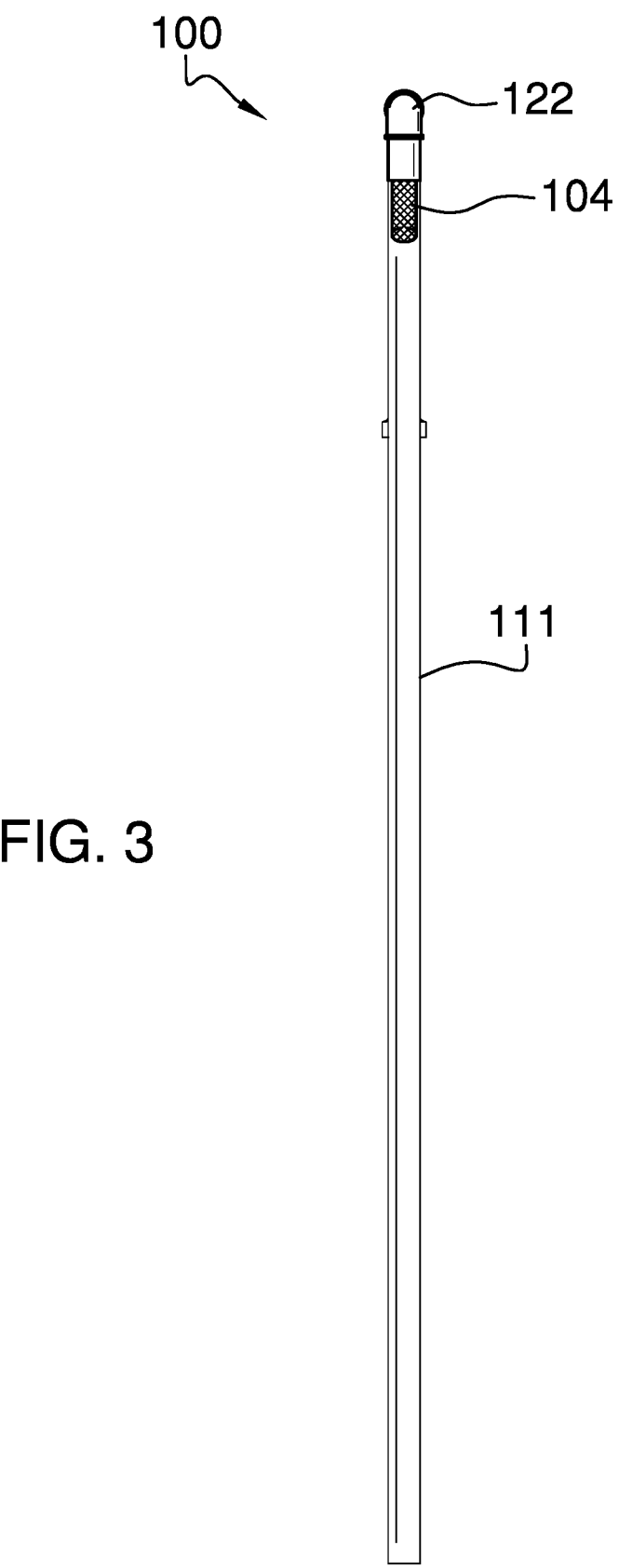
FIG. 3 is a front view of an embodiment of the disclosure.
Figure 4:
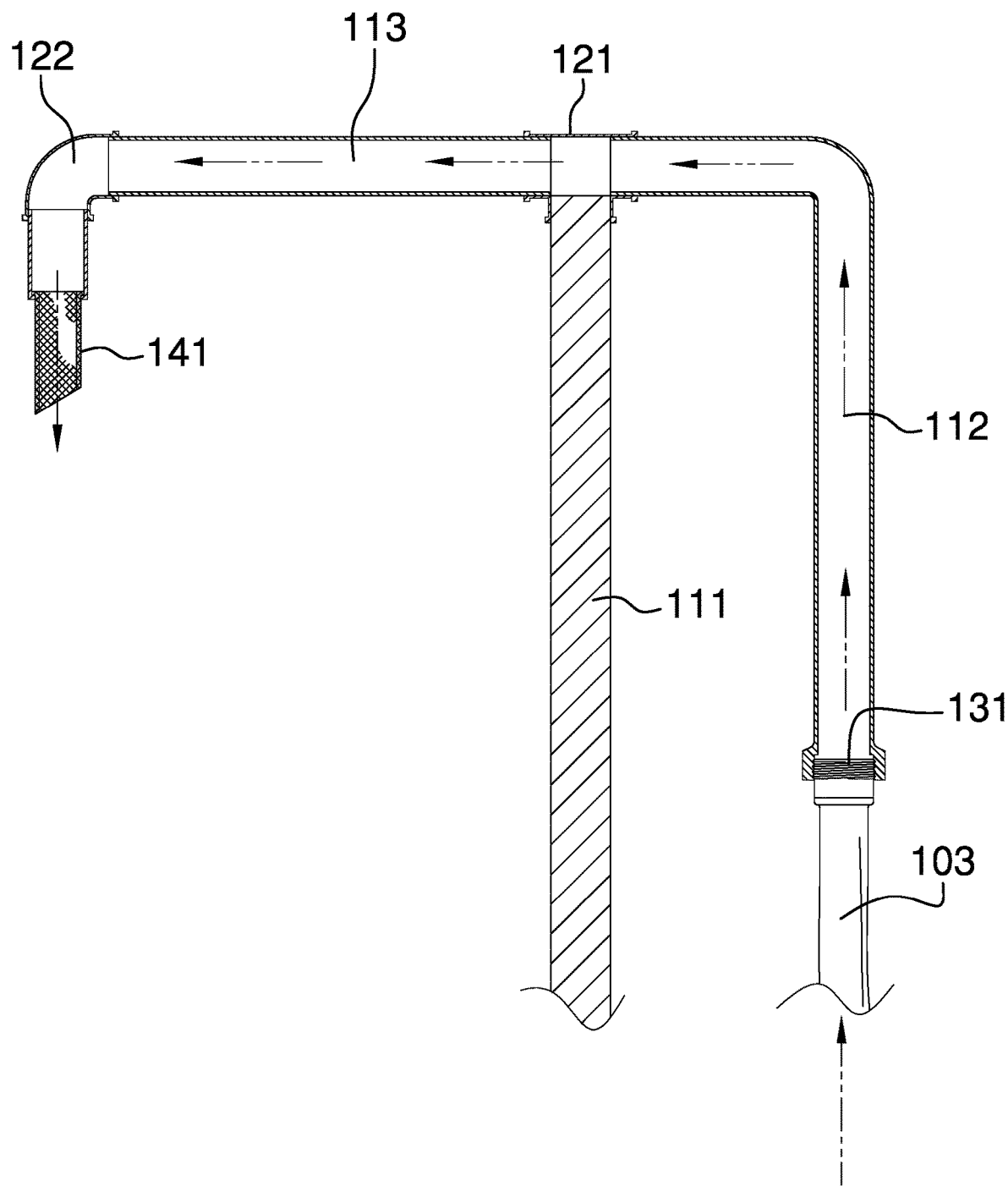
FIG. 4 is a cross-sectional view of an embodiment of the disclosure across 4-4 as shown in FIG. 1.
Figure 5:
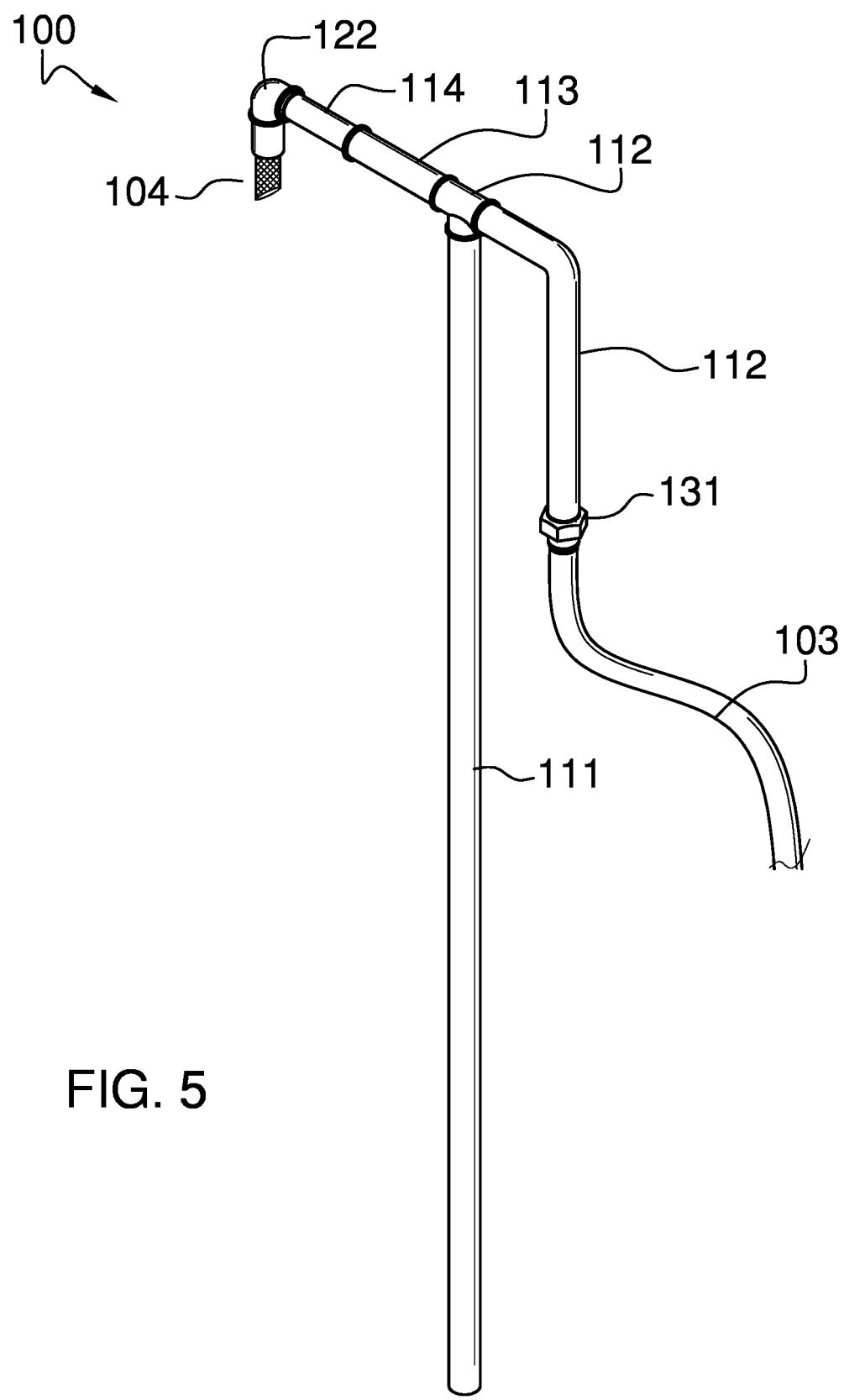
FIG. 5 is a perspective view of an alternate embodiment of the disclosure.
Figure 6:
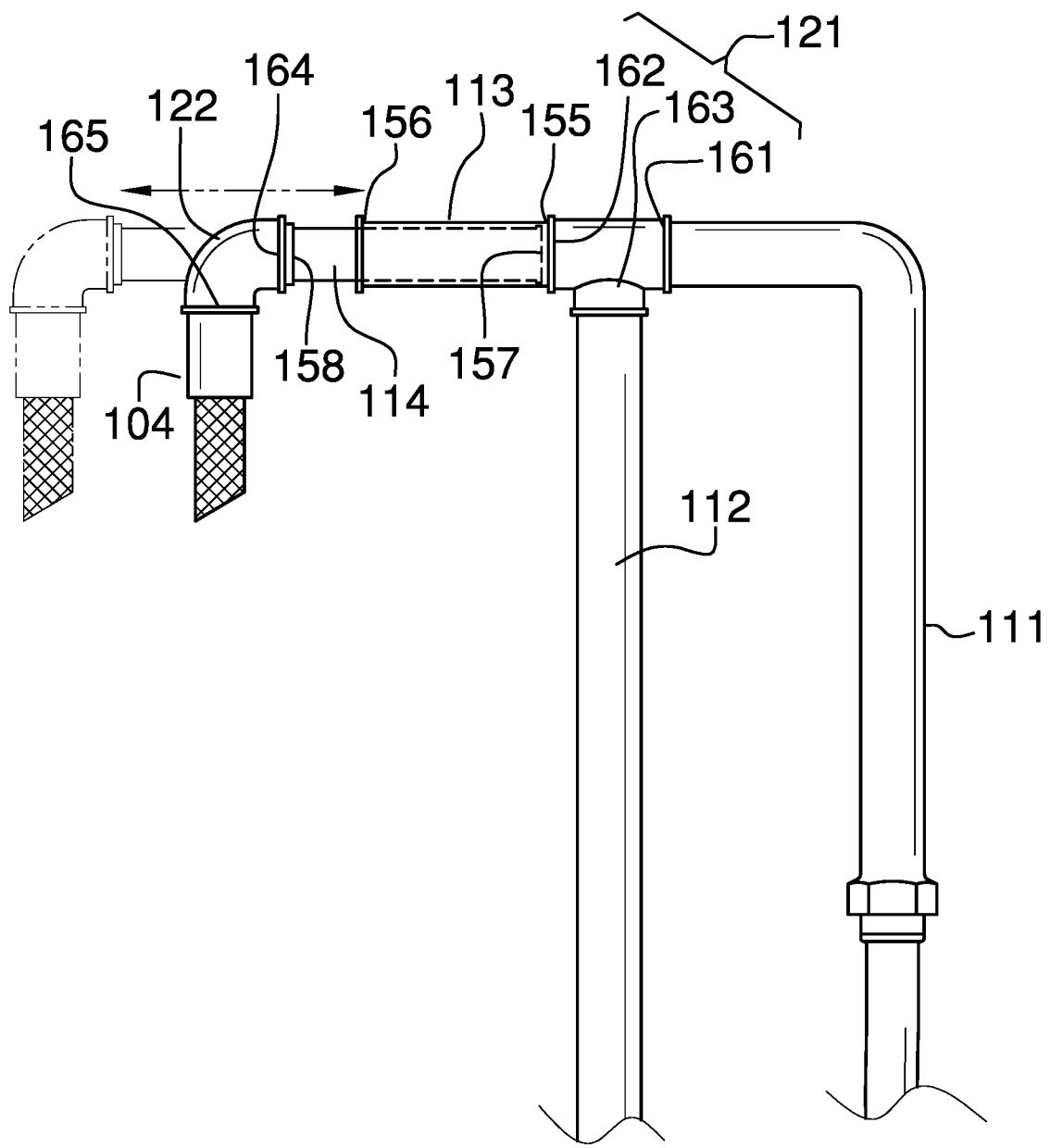
FIG. 6 is a detail view of an alternate embodiment of the disclosure.
Figure 7:
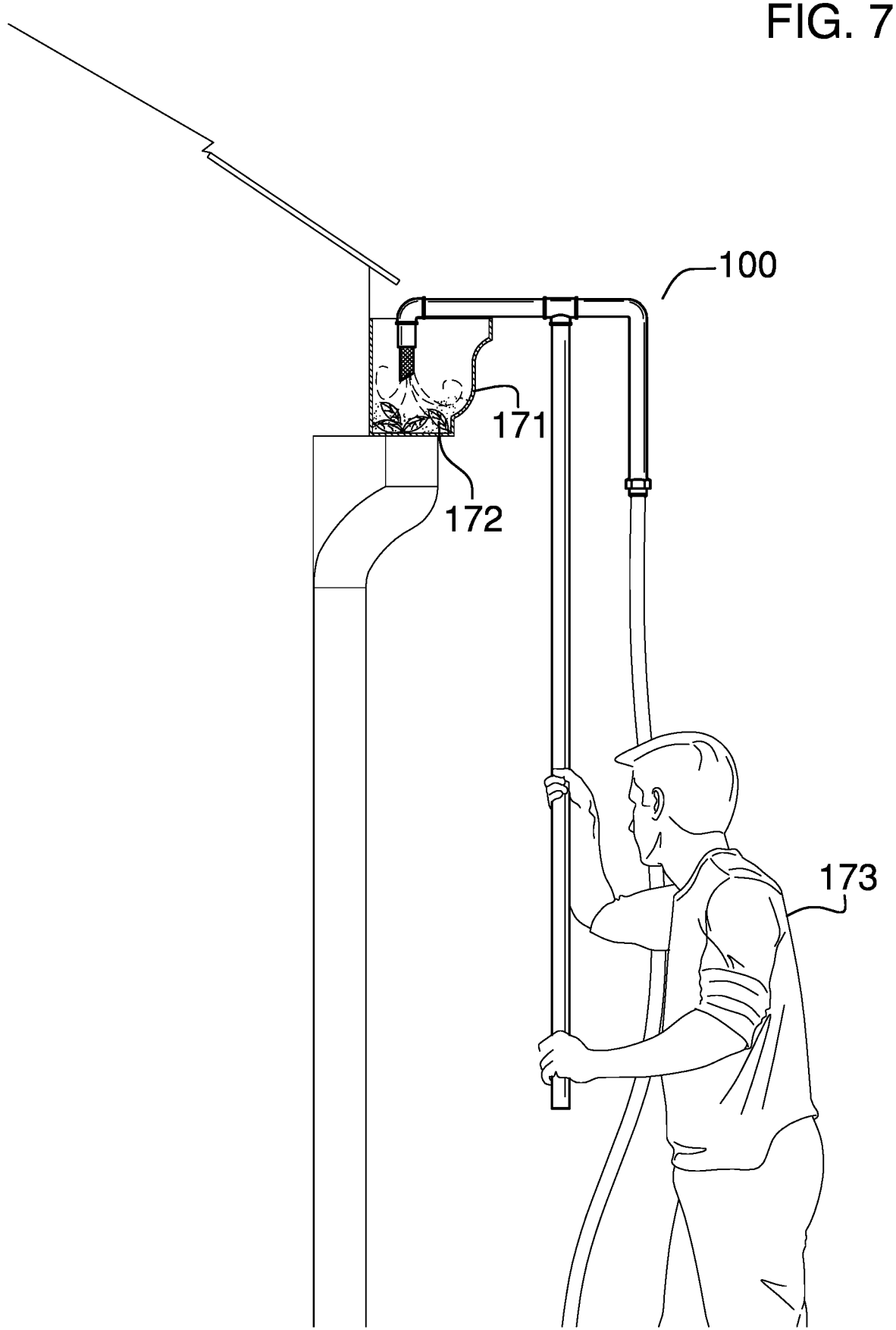
FIG. 7 is an in-use view of an embodiment of the disclosure.

Detailed reference will now be made to one or more potential embodiments of the disclosure, which are illustrated in FIGS. 1 through 7.

The gutter-cleaning device 100 (hereinafter invention) is configured for use in removing debris 172 from a gutter 171. The invention 100 discharges a flow of water into the gutter 171 that washes away the debris 172. The invention 100 is an extension apparatus that extends the reach of a client 173 such that the client 173 can discharge the flow of water into the gutter 171 while standing on the ground. The invention 100 comprises a plurality of pipes 101, a plurality of fittings 102, a hose 103, and a nozzle 104. The plurality of fittings 102 interconnect the plurality of pipes 101 to form a fluid network. The fluid network is a fluid series circuit that transports water received under pressure from the hose 103 to the nozzle 104. The nozzle 104 discharges the water into the gutter 171 that washes away the debris 172.

The gutter 171 is defined elsewhere in this disclosure. The debris 172 is defined elsewhere in this disclosure. The client 173 is defined elsewhere in this disclosure.

The plurality of pipes 101 forms a fluidic network that transports a flow of water from the hose 103 to the nozzle 104. The plurality of pipes 101 receives water under pressure from the hose 103. The fluidic network formed by the plurality of pipes 101 transports the received water to the nozzle 104 through a fluidic series circuit. The plurality of pipes 101 forms an extension structure that extends the reach between the client 173 and the nozzle 104 such that the client 173 inserts the nozzle 104 into the gutter 171 while the client 173 is standing on the ground. The plurality of pipes 101 comprises a first pipe 111, a second pipe 112, and a third pipe 113.

The first pipe 111 is a prism-shaped structure. The first pipe 111 is a hollow structure. The first pipe 111 attaches to the tee connector 121. The first pipe 111 forms an extension structure that extends the reach between the client 173 and the nozzle 104. The client 173 manually raises the first pipe 111 to elevate the nozzle 104 above the client 173. The first pipe 111 further comprises a first congruent end 151 and a second congruent end 152.

The first congruent end 151 is the inferior open end of the pipe structure of the first pipe 111. The first congruent end 151 is the free end of the first pipe 111. The second congruent end 152 is the superior open end of the pipe structure of the first pipe 111. The second congruent end 152 is the end of the first pipe 111 that attaches to the tee connector 121.

The second pipe 112 is a prism-shaped structure. The second pipe 112 is a hollow structure. The second pipe 112 forms a fluidic connection between the hose 103 and the tee connector 121. The second pipe 112 transports water received from the hose 103 to the tee connector 121. The second pipe 112 is formed with a 90 degree bend. The 90 degree bend is defined elsewhere in this disclosure. The second pipe 112 further comprises a third congruent end 153 and a fourth congruent end 154.

The third congruent end 153 is an open end of the pipe structure of the second pipe 112. The third congruent end 153 is the open end of the second pipe 112 that attaches to the hose 103. An element of the threaded connection 131 attaches to the third congruent end 153 of the second pipe 112 such that the hose 103 can be screwed into the third congruent end 153 to form the threaded connection 131. The fourth congruent end 154 is an open end of the pipe structure of the second pipe 112. The fourth congruent end 154 is the open end of the second pipe 112 that attaches to the tee connector 121.

The third pipe 113 is a prism-shaped structure. The third pipe 113 is a hollow structure. In the first potential embodiment of the disclosure, the third pipe 113 forms a fluidic connection between the tee connector 121 and the 90 degree elbow 122. The third pipe 113 transports water received from the tee connector 121 to the 90 degree elbow 122. The third pipe 113 further comprises a fifth congruent end 155 and a sixth congruent end 156.

The fifth congruent end 155 is an open end of the pipe structure of the third pipe 113. The fifth congruent end 155 is the open end of the third pipe 113 that attaches to the tee connector 121. The sixth congruent end 156 is an open end of the pipe structure of the third pipe 113. In the first potential embodiment of the disclosure, the sixth congruent end 156 is the open end of the third pipe 113 that attaches to the 90 degree elbow 122.

In a second potential embodiment of the disclosure, the plurality of pipes 101 further comprises a fourth pipe 114.

The fourth pipe 114 is a prism-shaped structure. The fourth pipe 114 is a hollow structure. In the second potential embodiment of the disclosure, the fourth pipe 114 forms a fluidic connection between the third pipe 113 and the 90 degree elbow 122. The fourth pipe 114 transports water received from the third pipe 113 to the 90 degree elbow 122. The third pipe 113 is further defined with an inner dimension. The fourth pipe 114 is further defined with an outer dimension.

The third pipe 113 and the fourth pipe 114 are geometrically similar. The span of the outer dimension of the fourth pipe 114 is less than the span of the inner dimension of the third pipe 113 such that the fourth pipe 114 inserts into the third pipe 113 in a telescopic manner to form a composite prism structure. In the second potential embodiment of the disclosure, the span of the length of between the tee connector 121 and the 90 degree elbow 122 adjusts by adjusting the relative position of the fourth pipe 114 within the third pipe 113.

The fourth pipe 114 further comprises a seventh congruent end 157 and an eighth congruent end 158. The seventh congruent end 157 is an open end of the pipe structure of the fourth pipe 114. The seventh congruent end 157 is the open end of the fourth pipe 114 that inserts into the third congruent end 153 of the third pipe 113. The eighth congruent end 158 is an open end of the pipe structure of the fourth pipe 114. The eighth congruent end 158 is the open end of the fourth pipe 114 that attaches to the 90 degree elbow 122.

In the second potential embodiment of the disclosure, the third pipe 113 forms a fluidic connection between the tee connector 121 and the fourth pipe 114. The third pipe 113 transports water received from the tee connector 121 to the fourth pipe 114.

Each of the plurality of fittings 102 is a fitting. The fitting is defined elsewhere in this disclosure. Each of the plurality of fittings 102 forms an attachment selected from the group consisting of: a) attaching an initial pipe selected from the plurality of pipes 101 to a subsequent pipe selected from the plurality of pipes 101; and, b) simultaneously attaching the initially selected pipe to both a first subsequent pipe selected from the plurality of pipes 101 and a second subsequent pipe selected from the plurality of pipes 101. The plurality of fittings 102 comprises a tee connector 121 and a 90 degree elbow 122.

The tee connector 121 is a three port fitting. Each port selected from the tee connector 121 attaches to a pipe selected from the plurality of pipes 101. The tee connector 121 is defined elsewhere in this disclosure. The tee connector 121 further comprises a first port 161, a second port 162, and a third port 163.

The first port 161 forms a fluid port of the tee connector 121. The second port 162 forms a fluid port of the tee connector 121 that is opposite to the first port 161. By opposite to the first port 161 is meant that the center of the second port 162 aligns with the center of the first port 161 such that the line between the center of the second port 162 and the center of the first port 161 is parallel to the flow of water through the tee connector 121.

The third port 163 forms a port of the tee connector 121 that is offset from the first port 161 and the second port 162. By offset is meant that: a) the center axis of the first pipe 111 aligns with the center point of the third port 163 such that the center axis of the first pipe 111 is perpendicular to the line formed between the center of the first port 161 and the center of the second port 162. The third port 163 forms a capped tubular structure such that water will not flow through the third port 163.

The fourth congruent end 154 of the second pipe 112 forms a fluidic connection with the first port 161 of the tee connector 121. The fifth congruent end 155 of the third pipe 113 forms a fluidic connection with the second port 162 of the tee connector 121. The second congruent end 152 of the first pipe 111 physically attaches to the third port 163 of the tee connector 121. The second congruent end 152 of the first pipe 111 does not form a fluidic connection with the third port 163 of the tee connector 121.

The 90 degree elbow 122 is a two port fitting. The 90 degree elbow 122 forms a 90 degree bend. The 90 degree elbow 122 secures the nozzle 104 to a pipe selected from the plurality of pipes 101. The 90 degree elbow 122 and the 90 degree bend are defined elsewhere in this disclosure. The 90 degree elbow 122 further comprises a fourth port 164 and a fifth port 165.

The fourth port 164 forms a fluid port of the 90 degree elbow 122. The fifth port 165 forms a fluid port of the 90 degree elbow 122 that is opposite to the fourth port 164. By opposite to the fourth port 164 is meant that position of the fifth port 165 relative to the flow path of the water through the 90 degree elbow 122 is at a location that is distal from the fourth port 164. The nozzle 104 attaches to the fifth port 165 of the 90 degree elbow 122.

The hose 103 is a prism-shaped structure. The hose 103 is a hollow structure. The hose 103 is a flexible structure. The hose 103 forms a fluidic connection with a pipe selected from the plurality of pipes 101. The hose 103 discharges water under pressure through the fluidic connection into the selected pipe. The hose 103 is defined elsewhere in this disclosure. The hose 103 further comprises a threaded connection 131. The threaded connection 131 is a fitting that removably attaches the hose 103 to the second pipe 112. In the first potential embodiment of the disclosure, the threaded connection 131 is a garden hose thread (GHT). The GHT is defined elsewhere in this disclosure. The threaded connection 131 is defined elsewhere in this disclosure.

The nozzle 104 forms a fluidic connection with a pipe selected from the plurality of pipes 101. The nozzle 104 receives water under pressure from the plurality of pipes 101. The nozzle 104 discharges the water received under pressure from the plurality of pipes 101 into the gutter 171. The water discharged by the nozzle 104 into the gutter 171 cleans the debris 172 out of the gutter 171. The nozzle 104 further comprises an angled discharge port 141. The angled discharge port 141 forms the physical discharge port of the nozzle 104. The angled discharge port 141 is formed as a prismatic section. The prismatic section is defined elsewhere in this disclosure. The angled discharge port 141 controls the direction of the water flow at the point of discharge.

The following two paragraphs summarize the assembly of the invention 100.

The first congruent end 151 is the free end of the first pipe 111. The second congruent end 152 of the first pipe 111 attaches to the third port 163 of the tee connector 121. The third congruent end 153 of the second pipe 112 attaches to the hose 103 using the threaded connection 131. The fourth congruent end 154 of the second pipe 112 attaches to the first port 161 of the tee connector 121. The fifth congruent end 155 of the third pipe 113 attaches to the second port 162 of the tee connector 121. The nozzle 104 attaches to the fifth port 165 of the 90 degree elbow 122. In the first potential embodiment of the disclosure, the sixth congruent end 156 of the third pipe 113 attaches to the fourth port 164 of the 90 degree elbow 122.

In the second potential embodiment of the disclosure, the sixth congruent end 156 of the third pipe 113 attaches to the seventh congruent end 157 of the fourth pipe 114. The seventh congruent end 157 of the fourth pipe 114 inserts into the sixth congruent end 156 of the third pipe 113. The eighth congruent end 158 of the fourth pipe 114 attaches to the fourth port 164 to the 90 degree elbow 122.

The following definitions were used in this disclosure:

90 Degree Bend: As used in this disclosure, a 90 degree bend refers to a prism structure with a constant diameter that has a 90 degree cant formed in the center axis of the prism structure at a location between the two congruent ends of the prism structure.

90 Degree Elbow: As used in this disclosure, a 90 degree elbow is a two aperture fitting that attaches a first pipe to a second pipe such that the center axis of the first pipe is perpendicular to the center axis of the second pipe.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Capped Pipe: As used in this disclosure, a capped pipe is a pipe with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Client: As used in this disclosure, a client is an individual who is designated to receive the services of the disclosure at bar.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Debris: As used in this disclosure, debris refers to an accumulation of loose and unwanted material on a surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Downspout: As used in this disclosure, a downspout is a vertically oriented pipe that transports water from the gutter associated with a pitched roof to a location distal from the building associated with the pitched roof.

Downspout Connector: As used in this disclosure, a downspout connector is an inert mechanical structure that attaches a downspout to a gutter such that water will drain from the gutter into the downspout.

Elbow: As used in this disclosure, an elbow is a fitting that interconnects a plurality of pipes such that the center axis of at least one pipe attached to the elbow intersects at a point with the center axis of each of the remaining pipes contained in the plurality of pipes. The aperture in an elbow that is intended to receive a pipe selected from the plurality of pipes is called a port. The elbow is commonly referred by the number of its port. For example, an elbow that is designed to interconnect four pipes is called a four port elbow.

Extensible: As used in this disclosure, extensible is an adjective that describes an object made of sections that fit or together such that the object can be made longer or shorter by adjusting the relative positions of the sections.

Extension Apparatus: As used in this disclosure, an extension apparatus is a mechanical structure that is used to extend or bridge the reach between any two objects.

Extension Structure: As used in this disclosure, an extension structure is an inert physical structure that is used to extend or bridge the reach between any two objects.

Fitting: As used in this disclosure, a fitting is a component that attaches a first object to one or more additional objects. The fitting is often used to forming a fluidic connection between the first object and the one or more additional objects.

Fixed End: As used in this disclosure, a fixed end refers to the end of a shaft, pipe, or tube that is secured to an object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Fluid Series Circuit: As used in this disclosure, a fluid series circuit refers to a method of connecting a plurality of fluid network elements that are connected to form a single fluid transport path from a first point to a second point in a fluid network.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Free End: As used in this disclosure, a free end refers to the end of a disk, shaft, pipe, or tube that is not secured to an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

GHT: As used in this disclosure, GHT refers to a standard Garden Hose Thread. The GHT is a threaded connection standard that is used in the United States for attaching a garden hose to a water supply or for attaching one or a plurality of attachments to the garden hose.

Ground: As used in this disclosure, the ground is a solid supporting surface formed by the Earth. The term level ground means that the supporting surface formed by the ground is roughly perpendicular to the force of gravity.

Gutter: As used in this disclosure, a gutter is a trough that is placed under the edge of a roof such that the gutter will transport water away from the roof to a downspout.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hose: As used in this disclosure, a hose is a flexible hollow tube that is used for transporting liquids and gases. When referring to a hose in this disclosure, the terms inner diameter and outer diameter are used as they would be used by those skilled in the plumbing arts.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Nozzle: As used in this disclosure, a nozzle is a device that receives fluid under pressure and releases the fluid in a controlled manner into an environment.

Offset: As used in this disclosure, an offset refers to two objects that are not in alignment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Port: As used in this disclosure, a port is an aperture formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prismatic Section: As used in this disclosure, a prismatic section refers to either one of the two objects formed by the bifurcation of a prism or pyramid by a plane that: 1) passes through the center axis of the prism or pyramid; and 2) does not perpendicularly intersect the center axis of the prism or pyramid. The angle of the prismatic section is the angle formed between the bifurcating plane and a line that is perpendicular to the center axis of the prism. A non-Euclidean prismatic section refers to a prismatic section that is bifurcated by a non-Euclidean plane.

Reach: As used in this disclosure, reach refers to a span of distance between any two objects.

Solid: As used in this disclosure, a solid refers to a state (phase) of matter that: 1) has a fixed volume; and, 2) does not flow.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tee Connector: As used in this disclosure, a Tee Connector is a three aperture fitting that is designed to connect a first pipe, a second pipe and a third pipe such that: 1) the center axis of the first pipe is aligned with the center axis of the second pipe; 2) the center axis of the third pipe is perpendicular to the aligned center axes of the first pipe and the second pipe; and, 3) the center axes of the first pipe, the second pipe, and the third pipe intersect at a single point. The tee connector is a commercially available plumbing and PVC pipe fitting.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Trough: As used in this disclosure, a trough is an open receptacle that is used to: 1) store a fluid in a manner accessible to an animal; or, 2) to physically determine and limit the flow path of a fluid. The rain gutter commonly seen on a building is an example of a trough.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gutter-cleaning device comprising
a plurality of pipes and a plurality of fittings;
wherein the plurality of fittings interconnect the plurality of pipes to form a fluid network;
wherein the gutter-cleaning device is configured for use in removing debris from a gutter;
wherein the gutter-cleaning device discharges a flow of water into the gutter that washes away the debris;
wherein the gutter-cleaning device is an extension apparatus that extends the reach of a client such that the client can discharge the flow of water into the gutter while standing on the ground;
wherein the gutter-cleaning device further comprises a hose and a nozzle;
wherein the hose is a source of water that feeds into the gutter-cleaning device;
wherein the nozzle discharges the water into the gutter to wash away the debris;
wherein the plurality of pipes forms a fluidic network that transports a flow of water from the hose to the nozzle;
wherein the nozzle forms a fluidic connection with a pipe selected from the plurality of pipes;
wherein the nozzle receives water under pressure from the plurality of pipes;
wherein the nozzle discharges the water received under pressure from the plurality of pipes into the gutter;
wherein the plurality of pipes forms an extension structure;
wherein the plurality of pipes comprises a first pipe, a second pipe, and a third pipe;
wherein the first pipe forms an extension structure that extends the reach between the client and the nozzle.

2. The gutter-cleaning device according to claim 1
wherein the plurality of pipes receives water under pressure from the hose;
wherein the fluidic network formed by the plurality of pipes transports the received water to the nozzle through a fluidic series circuit.

3. The gutter-cleaning device according to claim 2
wherein each of the plurality of fittings is a fitting;
wherein each of the plurality of fittings forms an attachment selected from the group consisting of: a) attaching an initial pipe selected from the plurality of pipes to a subsequent pipe selected from the plurality of pipes; and, b) simultaneously attaching the initially selected pipe to both a first subsequent pipe selected from the plurality of pipes and a second subsequent pipe selected from the plurality of pipes.

4. The gutter-cleaning device according to claim 3
wherein the hose is a hollow structure;
wherein the hose is a flexible structure;
wherein the hose forms a fluidic connection with a pipe selected from the plurality of pipes;
wherein the hose discharges water under pressure through the fluidic connection into the selected pipe;
wherein the hose further comprises a threaded connection;
wherein the threaded connection is a fitting that removably attaches the hose to the second pipe.

5. The gutter-cleaning device according to claim 4
wherein the nozzle further comprises an angled discharge port.

6. The gutter-cleaning device according to claim 5
wherein the plurality of fittings comprises a tee connector and a 90 degree elbow;
wherein each port selected from the tee connector attaches to a pipe selected from the plurality of pipes;
wherein the 90 degree elbow secures the nozzle to a pipe selected from the plurality of pipes.

7. The gutter-cleaning device according to claim 6
wherein the first pipe attaches to the tee connector;
wherein the second pipe forms a fluidic connection between the hose and the tee connector;
wherein the third pipe forms a fluidic connection between the tee connector and the 90 degree elbow.

8. The gutter-cleaning device according to claim 7
wherein the first pipe is a hollow structure;
wherein the first pipe attaches to the tee connector.

9. The gutter-cleaning device according to claim 8
wherein the second pipe is a hollow structure;
wherein the second pipe attaches to the tee connector;
wherein the second pipe that attaches to the hose;

wherein the second pipe transports water received from the hose to the tee connector;
wherein the second pipe is formed with a 90 degree bend;
wherein an element of the threaded connection attaches to the second pipe.

10. The gutter-cleaning device according to claim 9
wherein the third pipe is a hollow structure;
wherein the third pipe attaches to the tee connector;
wherein the third pipe attaches to the 90 degree elbow;
wherein the third pipe transports water received from the tee connector to the 90 degree elbow.

11. The gutter-cleaning device according to claim 10
wherein the tee connector is a three port fitting;
wherein the tee connector further comprises a first port, a second port, and a third port;
wherein the first port forms a fluid port of the tee connector;
wherein the second port forms a fluid port of the tee connector that is opposite to the first port;
wherein by opposite to the first port is meant that the center of the second port aligns with the center of the first port such that the line between the center of the second port and the center of the first port is parallel to the flow of water through the tee connector;
wherein the third port forms a port of the tee connector that is offset from the first port and the second port;
wherein by offset is meant that: a) the center axis of the first pipe aligns with the center point of the third port such that the center axis of the first pipe is perpendicular to the line formed between the center of the first port and the center of the second port;
wherein the third port forms a capped tubular structure such that water will not flow through the third port;
wherein the second pipe forms a fluidic connection with the first port of the tee connector;
wherein the third pipe forms a fluidic connection with the second port of the tee connector;
wherein the first pipe physically attaches to the third port of the tee connector;
wherein the first pipe does not form a fluidic connection with the third port of the tee connector.

12. The gutter-cleaning device according to claim 11
wherein the 90 degree elbow is a two port fitting;
wherein the nozzle attaches to the fifth port of the 90 degree elbow;
wherein the third pipe attaches to the 90 degree elbow;
wherein the 90 degree elbow forms a 90 degree bend;
wherein the 90 degree elbow secures the nozzle to a pipe selected from the plurality of pipes;
wherein the 90 degree elbow further comprises a fourth port and a fifth port;
wherein the fourth port forms a fluid port of the 90 degree elbow;
wherein the fifth port forms a fluid port of the 90 degree elbow that is opposite to the fourth port;
wherein by opposite to the fourth port is meant that position of the fifth port relative to the flow path of the water through the 90 degree elbow is at a location that is distal from the fourth port.

13. The gutter-cleaning device according to claim 9
wherein the third pipe is a hollow structure;
wherein the plurality of pipes further comprises a fourth pipe;
wherein the fourth pipe attaches to the third pipe;
wherein the fourth pipe attaches to the 90 degree elbow;
wherein the third pipe attaches to the tee connector;
wherein the fourth pipe is a hollow structure;
wherein the fourth pipe forms a fluidic connection between the third pipe and the degree elbow;
wherein the third pipe transports water received from the tee connector to the fourth pipe;
wherein the fourth pipe transports water received from the third pipe to the 90 degree elbow.

14. The gutter-cleaning device according to claim 13
wherein the third pipe is further defined with an inner dimension;
wherein the fourth pipe is further defined with an outer dimension;
wherein the third pipe and the fourth pipe are geometrically similar;
wherein the span of the outer dimension of the fourth pipe is less than the span of the inner dimension of the third pipe such that the fourth pipe inserts into the third pipe in a telescopic manner to form a composite structure;
wherein the span of the length of between the tee connector and the 90 degree elbow adjusts by adjusting the relative position of the fourth pipe within the third pipe.

15. The gutter-cleaning device according to claim 14
wherein the tee connector is a three port fitting;
wherein the tee connector further comprises a first port, a second port, and a third port;
wherein the first port forms a fluid port of the tee connector;
wherein the second port forms a fluid port of the tee connector that is opposite to the first port;
wherein by opposite to the first port is meant that the center of the second port aligns with the center of the first port such that the line between the center of the second port and the center of the first port is parallel to the flow of water through the tee connector;
wherein the third port forms a port of the tee connector that is offset from the first port and the second port;
wherein by offset is meant that: a) the center axis of the first pipe aligns with the center point of the third port such that the center axis of the first pipe is perpendicular to the line formed between the center of the first port and the center of the second port;
wherein the third port forms a capped tubular structure such that water will not flow through the third port;
wherein the second pipe forms a fluidic connection with the first port of the tee connector;
wherein the third pipe forms a fluidic connection with the second port of the tee connector;
wherein the first pipe physically attaches to the third port of the tee connector;
wherein the first pipe does not form a fluidic connection with the third port of the tee connector.

16. The gutter-cleaning device according to claim 15
wherein the 90 degree elbow is a two port fitting;
wherein the nozzle attaches to the 90 degree elbow;
wherein the 90 degree elbow forms a 90 degree bend;
wherein the 90 degree elbow further comprises a fourth port and a fifth port;
wherein the fourth port forms a fluid port of the 90 degree elbow;
wherein the fifth port forms a fluid port of the 90 degree elbow that is opposite to the fourth port;
wherein by opposite to the fourth port is meant that position of the fifth port relative to the flow path of the water through the 90 degree elbow is at a location that is distal from the fourth port.

\* \* \* \* \*